(12) United States Patent  (10) Patent No.: US 8,054,838 B2
Huang et al.  (45) Date of Patent: Nov. 8, 2011

(54) METHOD AND APPARATUS OF TRANSMITTING DATA VIA A MULTI-PROTOCOL SINGLE-MEDIUM NETWORK

(75) Inventors: Yung-Ching Huang, Taipei (TW);
Wei-Wen Hu, Kaohsiung (TW);
Yu-Hsien Chiu, Kaohsiung County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 335 days.

(21) Appl. No.: 12/111,251

(22) Filed: Apr. 29, 2008

(65) Prior Publication Data

US 2009/0161678 A1    Jun. 25, 2009

(30) Foreign Application Priority Data

Dec. 24, 2007  (TW) ................................ 96149669 A (51) Int. Cl.
*H04L 12/28* (2006.01)
*H04L 12/56* (2006.01)
(52) U.S. Cl. .................... 370/395.5; 370/395.6
(58) Field of Classification Search .................... None
See application file for complete search history.

(56) References Cited

U.S. PATENT DOCUMENTS

| | | | |
|---|---|---|---|
| 6,563,821 B1 * | 5/2003 | Hong et al. ................... | 370/389 |
| 6,680,952 B1 | 1/2004 | Berg et al. | |
| 6,831,913 B1 | 12/2004 | Vialen | |
| 6,963,561 B1 * | 11/2005 | Lahat ............................. | 370/356 |
| 7,133,416 B1 * | 11/2006 | Chamdani et al. ............ | 370/466 |
| 7,145,887 B1 | 12/2006 | Akgun et al. | |
| 7,346,047 B1 * | 3/2008 | Berg et al. ..................... | 370/352 |
| 7,440,415 B2 * | 10/2008 | Wild et al. ..................... | 370/254 |
| 7,593,399 B2 * | 9/2009 | Nishihara ...................... | 370/389 |
| 7,672,300 B1 * | 3/2010 | Medina et al. ................ | 370/366 |
| 2002/0024965 A1 | 2/2002 | Lee | |
| 2002/0085567 A1 * | 7/2002 | Ku et al. ........................ | 370/396 |
| 2002/0087685 A1 * | 7/2002 | Lassen et al. ................. | 709/225 |
| 2002/0093972 A1 * | 7/2002 | Hollums et al. .............. | 370/419 |
| 2004/0054798 A1 * | 3/2004 | Frank et al. ................... | 709/229 |
| 2004/0136396 A1 | 7/2004 | Yonge | |
| 2004/0147223 A1 * | 7/2004 | Cho .............................. | 455/41.2 |

(Continued)

FOREIGN PATENT DOCUMENTS

WO    2004038980    5/2004

OTHER PUBLICATIONS

European Patent Office, "Office Action", May 19, 2011, Europe.

(Continued)

*Primary Examiner* — Ayaz Sheikh
*Assistant Examiner* — Peter Chau
(74) *Attorney, Agent, or Firm* — WPAT., P.C.; Justin King (57) ABSTRACT

The present invention relates to a method and an apparatus of transmitting data via a multi-protocol single-medium network. The method includes initializing a network; transmitting messages in the network; setting up the size and the protocol of the messages and assigning the messages to a multi-protocol stack of the PHY layer based on a network time sharing multitasking principle; assigning each of the messages to a proper time slot; checking whether or not all messages are assigned to the proper time slots; if yes, transmitting the messages; and receiving the messages by a network device and transmitting the messages to another network device via a single-medium network.

10 Claims, 7 Drawing Sheets

U.S. PATENT DOCUMENTS

| | | | |
|---|---|---|---|
| 2004/0156360 A1* | 8/2004 | Sexton et al. | 370/389 |
| 2005/0114489 A1 | 5/2005 | Yonge | |
| 2005/0169296 A1 | 8/2005 | Katar | |
| 2005/0213502 A1* | 9/2005 | Convertino et al. | 370/229 |
| 2006/0003696 A1* | 1/2006 | Diaz Cervera et al. | 455/11.1 |
| 2006/0129724 A1* | 6/2006 | Kostadinov | 710/106 |
| 2006/0153237 A1 | 7/2006 | Hwang | |
| 2006/0187960 A1* | 8/2006 | Murakami et al. | 370/469 |
| 2006/0198387 A1 | 9/2006 | Yonge | |
| 2006/0221998 A1* | 10/2006 | Livet et al. | 370/464 |
| 2006/0291464 A1* | 12/2006 | Primrose et al. | 370/389 |
| 2007/0116012 A1* | 5/2007 | Chang et al. | 370/395.52 |
| 2008/0002636 A1* | 1/2008 | Gaur et al. | 370/338 |
| 2008/0146163 A1* | 6/2008 | Korneluk et al. | 455/73 |
| 2008/0181212 A1* | 7/2008 | Curcio et al. | 370/389 |

OTHER PUBLICATIONS

Ross Bannatyne, "Time Triggered Protocol: TTP/C:", Mar. 1, 1993, Embedded Systems Programming.

* cited by examiner

81
channel:master controller to a hub 2

| ··· | CAN | RS-485 | Ethernet | | CAN | RS-485 | Ethernet | ··· |

82
channel:master controller to a hub 1

| ··· | CAN | | Ethernet | | CAN | | Ethernet | ··· |

83
channel: hub 2 to television

| ··· | | RS-485 | Ethernet | | | RS-485 | Ethernet | ··· |

84
channel:hub 2 to a monitor screen

| ··· | CAN | RS-485 | | | CAN | RS-485 | | ··· |

85
channer:hub 1 to media storage device

| ··· | | | Ethernet | | | | Ethernet | ··· |

86
channel:hub 1 to a camera

| ··· | CAN | | | | CAN | | | ··· |

87
channel:master controller to a door alarm

| ··· | | RS-485 | | | | RS-485 | | ··· |

FIG. 8

METHOD AND APPARATUS OF TRANSMITTING DATA VIA A MULTI-PROTOCOL SINGLE-MEDIUM NETWORK

FIELD OF THE INVENTION

The present invention relates to a method and an apparatus of transmitting data via a multi-protocol single-medium network.

BACKGROUND OF THE INVENTION

In recent years, network technologies advance rapidly, and thus the chance and demand of using a network become increasingly higher. To meet the requirements of transmitting messages over the network, network manufacturers provide different technologies and standards to support different objectives and environments. As to the different network transmission standards, a solution of transmitting messages of different transmission standards via a network is an important subject.

In general, a conventional network requires a network transmission line for the transmission of messages, and sometimes requires two or more transmission protocol standards to transmit messages to meet the requirements of different purposes. In other words, two or more types of cables are sometimes needed, and thus incurring an additional cost of the cables for constructing the network infrastructure. To transmit messages of two transmission protocol standards among different networks, a network protocol converting device is used and thus incurs an additional cost. As technology advances, new network protocol standards are introduced, and finding a way of effectively lowering the cost for constructing the infrastructure and flexibly updating a transmission protocol standard on the existing cable structure demands immediate attentions and feasible solutions.

In the prior art, messages are transmitted via a network according to different transmission standards such as an IP or non-IP transmission standard including Ethernet, X-10, control area network (CAN), RS-485, 1394, universal serial bus (USB) and media oriented systems transport (MOST), etc. In an example of the application, the messages of two different transmission protocols and standards are transmitted among different networks. In the present existing method, an appropriate protocol converting device is installed among networks of different transmission protocols and standards for converting the messages. However, it is necessary to install a plurality of protocol converting devices of several different transmission protocols and standards for transmitting the messages in order to meet the requirements of an increasing larger network structure and more updated network protocol standards, and such architecture becomes more complicated and incurs a higher cost.

In the prior art, a network connecting device uses a gateway to connect two networks of different protocols, and a typical gateway adopts a combination of software and hardware for interpreting the protocol, and then transmits the data from a network to another network. The network architecture is connected by a gateway in the prior art, and the transmission of the messages via independent networks of different protocols requires the interpretation by the gateway.

In the prior art, the mechanisms used for accessing messages of different types of protocols transmitted through a single medium includes polling, token passing, carrier sense multiple access (CSMA) and time division multiple access (TDMA). In the conventional polling mechanism, a master station periodically inquires a slave station for controlling the priority of the network media of the slave station. In the conventional token passing mechanism, a token ring at a network node of a token-ring network is provided for processing. The determination of a protocol used for the accessing procedure in the conventional CSMA mechanism is determined by the competition among the stations, and each station monitors the network condition to determine whether or not the network is in an idle state. If the network is at an idle state, the station will start transmitting signals after a predetermined time period. If a conflict exists, the station will continue monitoring the network condition and wait for the correct time for transmitting the signals. In the conventional TDMA mechanism, a network master station issues and broadcast a message to a plurality of frames synchronously, such that the time slot of each frame is synchronized, and the time slot for transmitting the signals is assigned, and each slave station receives a message synchronization signal and uses the signal for specifying the time slot for the signal transmission.

A method and an apparatus of transmitting data via a multi-protocol single-medium network data in accordance with the present invention adopt a TDMA multi-protocol access mechanism. U.S. Pat. No. 6,831,913 entitled "Method of identifying network layer PDU" and U.S. Pat. Application No. 2006/0153237 entitled "Communication system with improved medium access control sub-layer" did not teach a common method of accessing messages of different protocols, but both patents store different types of protocols in seven network layers of the OSI network. U.S. Pat. Application No. 2006/0198387 entitled "Reserving time periods for communication on power line networks" uses a CSMA mechanism which is different from the method using the TDMA mechanism in accordance with the present invention. U.S. Pat. Application No. 2004/0136396 entitled "Contention-free access intervals on a CSMA network", U.S. Pat. Application No. 2005/0114489 entitled "Medium access control layer that encapsulates data from a plurality of received data units into a plurality of independently transmittable blocks" and U.S. Pat. Application No. 2005/0169296 entitled "Temporary priority promotion for network communications in which access to a shared medium depends on a priority level" adopt the CSMA protocol mechanism. Unlike the protocol stack disclosed in the present invention, these patented inventions use a protocol stack on a physical layer.

Since the method and apparatus of transmitting data via a multi-protocol single-medium network in accordance with the invention adopt a TDMA mechanism, the prior art single medium for transmitting different network services includes MOST, and the prior art TDMA protocol includes FlexRay, TTP/C and Byteflight, etc. The MOST of the same packet includes control messages, synchronous messages and asynchronous messages used for providing several types of network transmission services, but its shock-proof mechanism adopts CSMA, and FlexRay uses different time slots for storing different transmitting messages for transmitting data, and the packet comes with a fixed length which is a variable packet length in this invention, and the protocol in each packet may vary. Although the TTP/C uses the same TDMA protocol, yet the packets of different protocols transmitted in the time slots are different.

In view of the foregoing shortcomings of the prior art, the present invention provides a method and an apparatus of transmitting data via a multi-protocol single-medium network for transmitting messages of different transmission protocols through a single medium, wherein different network devices can select an appropriate transmission protocol for receiving the messages, and transmitting the messages to another network device through the single medium.

SUMMARY OF THE INVENTION

In one exemplary embodiment, the present disclosure is directed to a multi-protocol single-medium network data transmitting method, applied to a single channel for transmitting a plurality of packets of different network protocols.

The method comprises initializing a network; transmitting a plurality of messages via the network; using a multi-protocol stack on a network physical layer for a multi-protocol network assignment based on a time sharing multitasking principle, and setting the size of the plurality of messages and the communication protocol of the plurality of messages. The method further comprises assigning the plurality of messages to appropriate time slots; checking whether or not all messages are assigned to the desired time slots; transmitting the plurality of messages if all messages are assigned to the desired time slots; and selectively receiving the plurality of appropriate messages through a network device, and transmitting the messages to another network device through a single-medium network; wherein, the network device can receive a plurality of messages of different network protocols and transmit the messages to another network device after converting the network protocol of the messages.

In another exemplary embodiment, the present disclosure is directed to an apparatus of transmitting data via a multi-protocol single-medium network, applied for transmitting or receiving different network protocol packets in a single-medium network.

The apparatus comprises a high-speed sampling circuit, for constructing a multi-protocol network physical layer; and a microcontroller, for controlling a protocol determination unit and a multi-protocol network media access control layer in a multi-protocol transceiver by software, and determining a protocol, a destination, a time slot, a priority and a data length of the packet.

DETAILED DESCRIPTION

Figure 1:
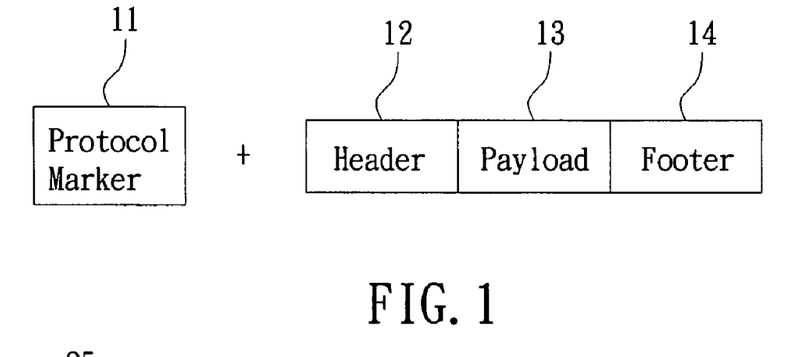
FIG. 1 is a schematic view of transmitting a packet in accordance with a method of transmitting data via a multi-protocol network.

Referring to FIG. 1, FIG. 1 shows a schematic view of transmitting a packet in accordance with a method of transmitting data via a multi-protocol network, and the packet includes a header 12, a footer 14 and a payload 13. To identify the packets of different protocols transmitted via the same cable, the invention adds a plurality of protocol markers 11 in front of the original packet header, such that the protocol of each packet can be identified. With the method disclosed in the present invention, the functions of the protocol marker 11 include time synchronization, packet protocol indication and packet length indication.

Figure 2:
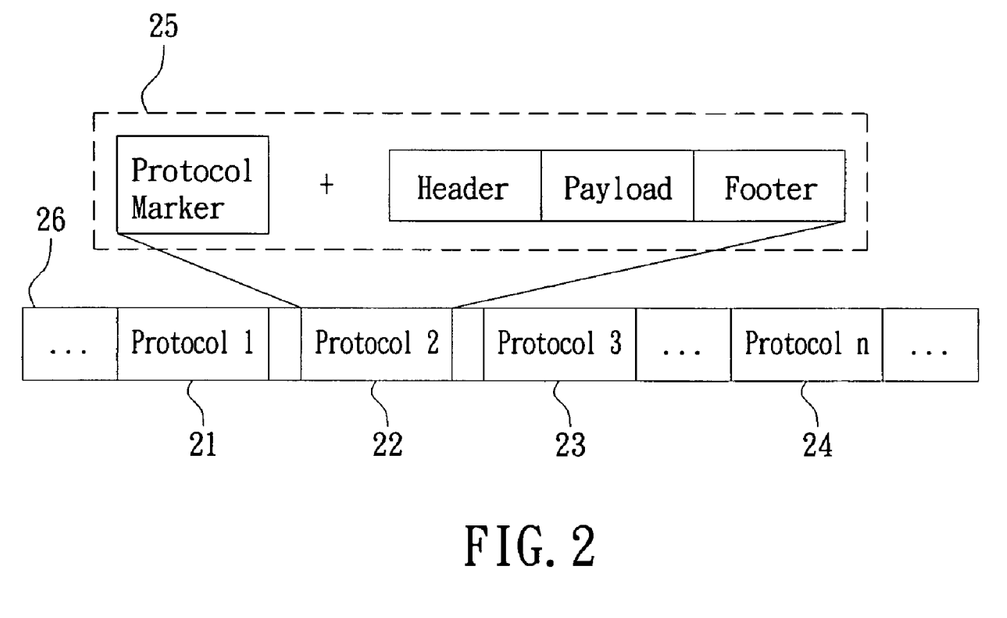
FIG. 2 is a schematic view of transmitting packets of different protocols in the same channel.

Referring to FIG. 2 for a schematic view of transmitting packets of different protocols in the same channel 26, a TDMA mode is adopted by the packets of different protocols 21, 22, 23, 24 used in the method of transmitting data via a multi-protocol single-medium network in accordance with the invention, and the transmission rate of the message of each protocol, the data volume of the messages for each protocol and the priority of arranging the packets of each protocol packet are determined by the requirements of each protocol. In FIG. 2, a packet 25 in a channel 26 is assigned with a protocol 22 and waits for the transmission.

Figure 3:
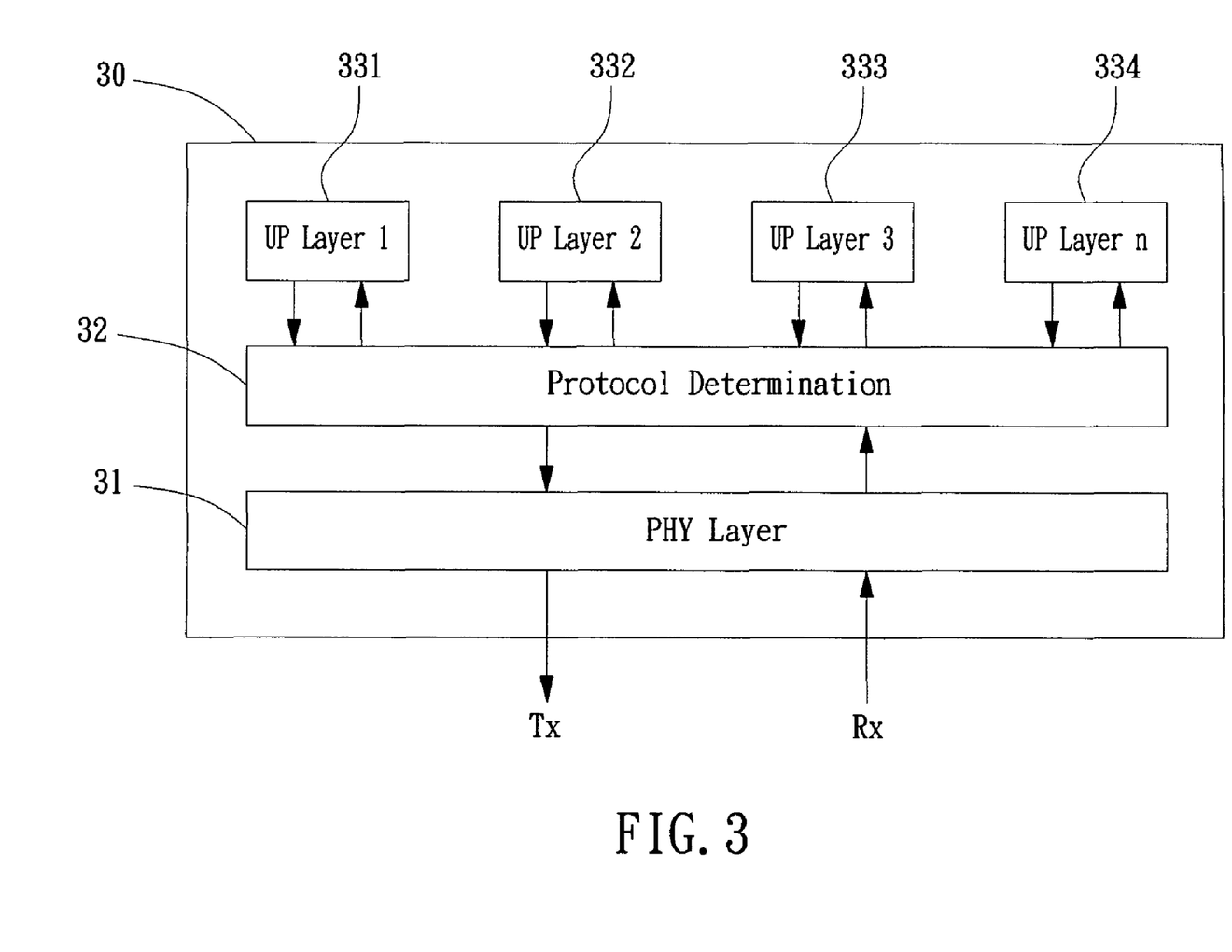
FIG. 3 is a schematic view of a protocol stack of a multi-protocol packet.

Referring to FIG. 3 for a schematic view of a protocol stack of a multi-protocol packet, the present invention adopts a TDMA method for transmitting the multi-protocol messages to make sure that a specific message can be transmitted to a specific network device within a specific time, and thus the invention is applicable for various different network protocols. The invention selects a common physical layer (PHY Layer) 31 for the protocol stacks 331, 332, 333, 334 on the physical layer of each protocol to operate with a protocol determination unit 32 in order to transmit and receive the multi-protocol messages in a channel 30. The function of each unit of the protocol stack as shown in FIG. 3 is described as follows:

The PHY Layer 31 is provided primarily for the conversion of signals and the exchange of data packets, and the protocol determination unit 32 is provided for determining the protocol of a data when the transmitted and received data are different. In the process of receiving data, the protocol determination unit 32 determines the protocol of the data and removes the protocol marker, and then transmits the data to an appropriate upper protocol stack 331, 332, 333, 334. In the process of transmitting data, the protocol determination unit 32 is provided for adding the protocol marker to the upper protocol stack 331, 332, 333, 334 before transmitting the protocol packet, and then transmitting the data to the physical layer 31 to complete the transmission of the data, and the upper protocol stack 331, 332, 333, 334 varies with a different protocol in the multi-protocol network.

Figure 4:
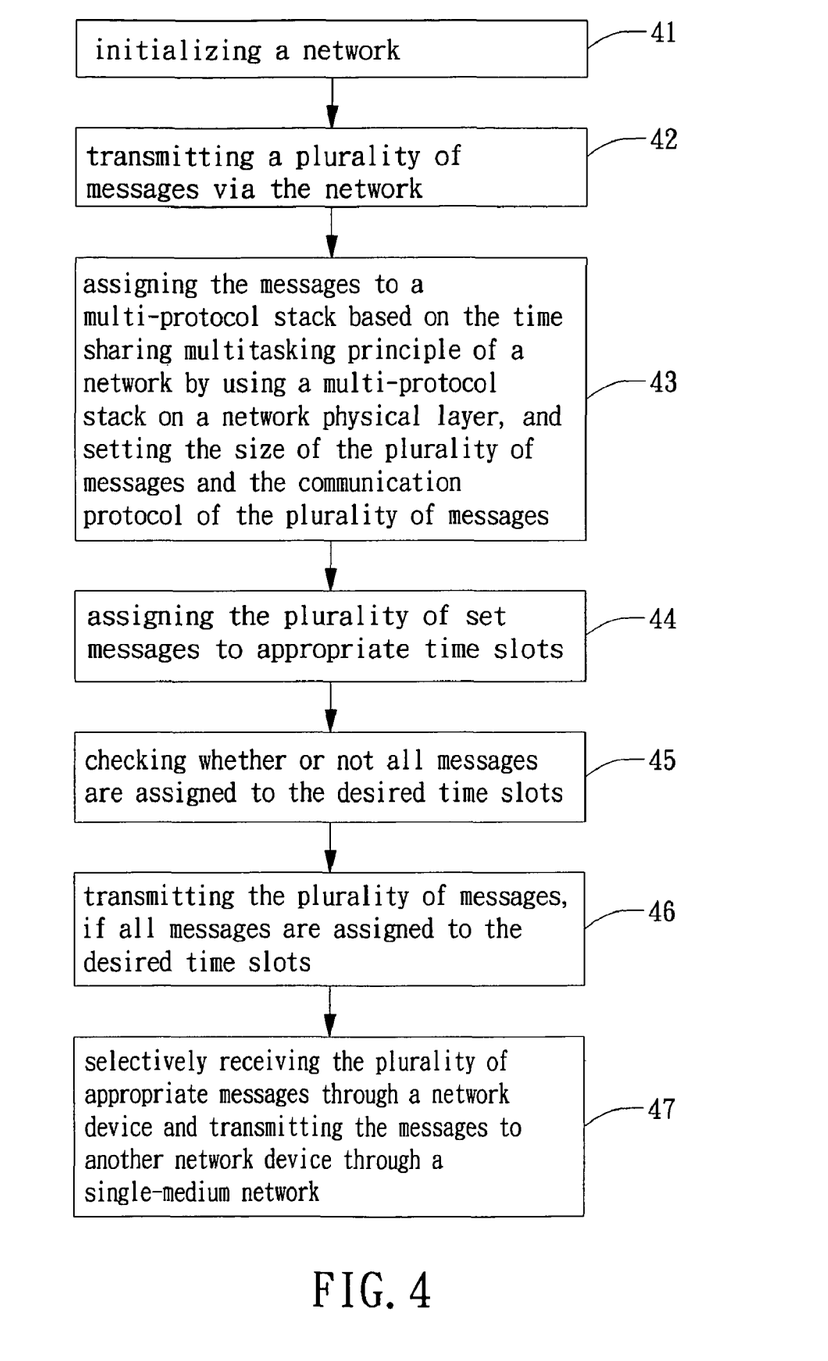
FIG. 4 is a flow chart of a method of transmitting data via a multi-protocol single-medium network in accordance with the present invention.

Referring to FIG. 4 for a flow chart of a method of transmitting data via a multi-protocol single-medium network in accordance with the present invention, the method comprises the steps of:

Step 41: initializing a network;

Step 42: transmitting a plurality of messages via the network;

Step 43: assigning the messages to a multi-protocol stack based on the time sharing multitasking principle of a network by using a multi-protocol stack on a network physical layer, and setting the size of the plurality of messages and the communication protocol of the plurality of messages;

Step 44: assigning the plurality of set messages to appropriate time slots;

Step 45: checking whether or not all messages are assigned to the desired time slots;

Step 46: transmitting the plurality of messages, if all messages are assigned to the desired time slots; and Step 47: selectively receiving the plurality of appropriate messages through a network device and transmitting the messages to another network device through a single-medium network.

Figure 5:
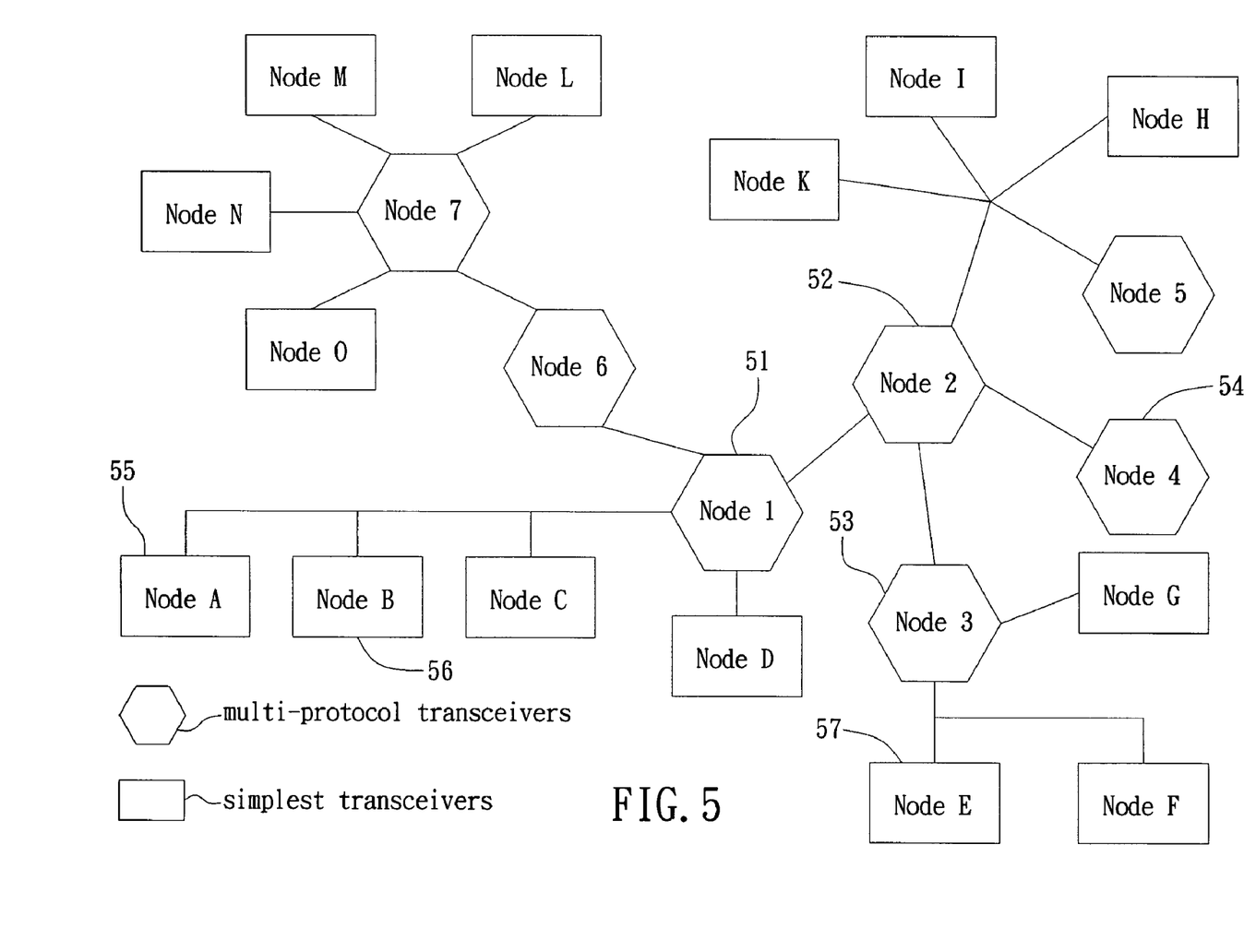
FIG. 5 is a schematic view of a network architecture of a multi-protocol network.

Referring to FIG. 5 for a schematic view of a network architecture of a multi-protocol network, the two transceivers used in the invention are multi-protocol transceivers 51, 52, 53, 54 and the simplest transceivers 55, 56, 57, and the function of these two types of transceivers is described as follows: a protocol stack of the multi-protocol transceiver 51, 52, 53, 54 includes an upper protocol stack of a protocol required in the multi-protocol network that depends on the transmission condition of the network. In other words, this multi-protocol transceiver 51, 52, 53, 54 can receive or transmit data in two or more protocols. The protocol stack of the simplest transceiver 55, 56, 57 only includes an upper protocol stack of one protocol, and the simplest transceiver 55, 56, 57 generally exists at the end of the network architecture, because it is not necessary to receive or transmit data in several different protocols, and thus the protocol stack exists in the simplest form in the network.

If the multi-protocol network is constructed, the whole network architecture follows the master-slave relation, and the whole network is formed by a plurality of master and slave stations. The aforementioned simplest transceiver can only be a slave station, and the multi-protocol transceiver can be either a master station or a slave station. The master station primarily determines the connected timing base as well as the priority of each protocol according to the network protocol required by the network, and appropriately assigns the time slot of each protocol. Overall speaking, the functions of the master station include: the determination of the number of protocols used for the transmissions in a multi-protocol network, the priority of the transmission protocols, and the time slot of each protocol, and the transmission timing of each protocol. If the whole network architecture has several master stations, the timing base of the whole network is determined simply by a single master station, and the determination method is based on the previous settings for constructing the network.

Figure 6:
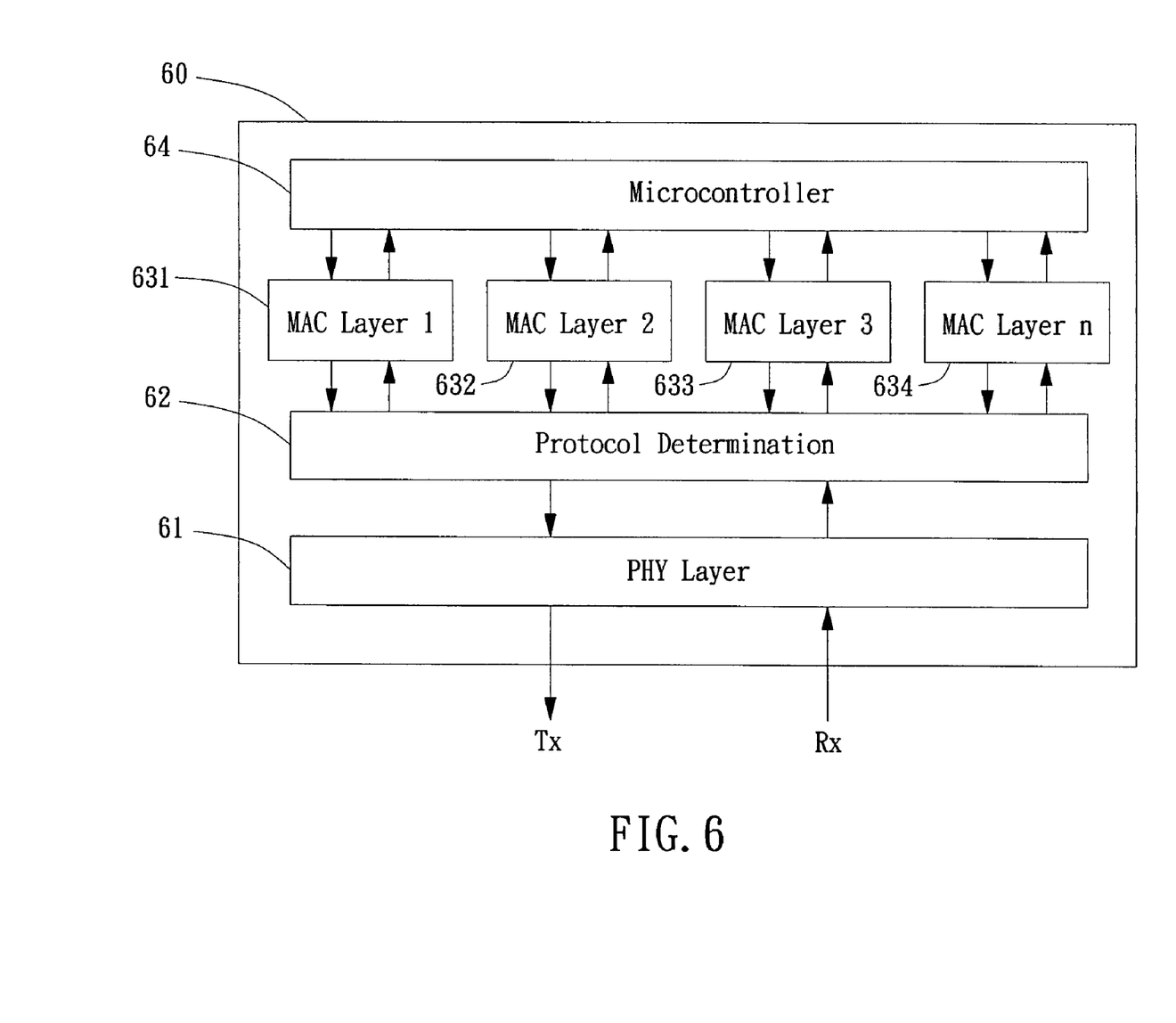
FIG. 6 is a schematic view of an internal architecture of a multi-protocol packet transceiver.

The present invention also discloses an apparatus of transmitting data via a multi-protocol single-medium network. Referring to FIG. 3 for a schematic view of a protocol stack of a multi-protocol packet if multi-protocol packets are transmitted through a single channel, and FIG. 6 for a schematic view of an internal architecture of a multi-protocol packet transceiver, the multi-protocol packet transceiver 60 comprises a physical layer (PHY Layer) 61, a protocol determination unit 62, a plurality of media access control layers (MAC layers) 631, 632, 633, 634 of different protocols, and a microcontroller 64. The function of each unit is described as follows. The physical layer 61 is a high-speed sampling circuit provided for exchanging signals and data packets. The protocol determination unit 62 has two main functions: one of the functions is to determine the protocol of the data if the apparatus is at the state of receiving data, and remove the protocol marker before transmitting the data to an appropriate media access control layer, and the other function is to add a protocol marker in front of a protocol packet transmitted from a media access control layer before transmitting the data to the physical layer, if the apparatus is at the state of transmitting data. The main function of the media access control layers 631, 632, 633, 634 is to obtain a payload of a packet and transmit the payload to a microcontroller 64 for processing in a data receiving process, or packages the payload into a packet and add a protocol marker by a protocol determination unit 62 before transmitting the packet in a data transmitting process. The microcontroller 64 is provided primarily for processing the data and determining a protocol, a destination, a time slot, a priority and a data length of a packet.

Specific applications of the method and apparatus of transmitting data via a multi-protocol single-medium network of the invention are illustrated by the following embodiments.

Figure 7:
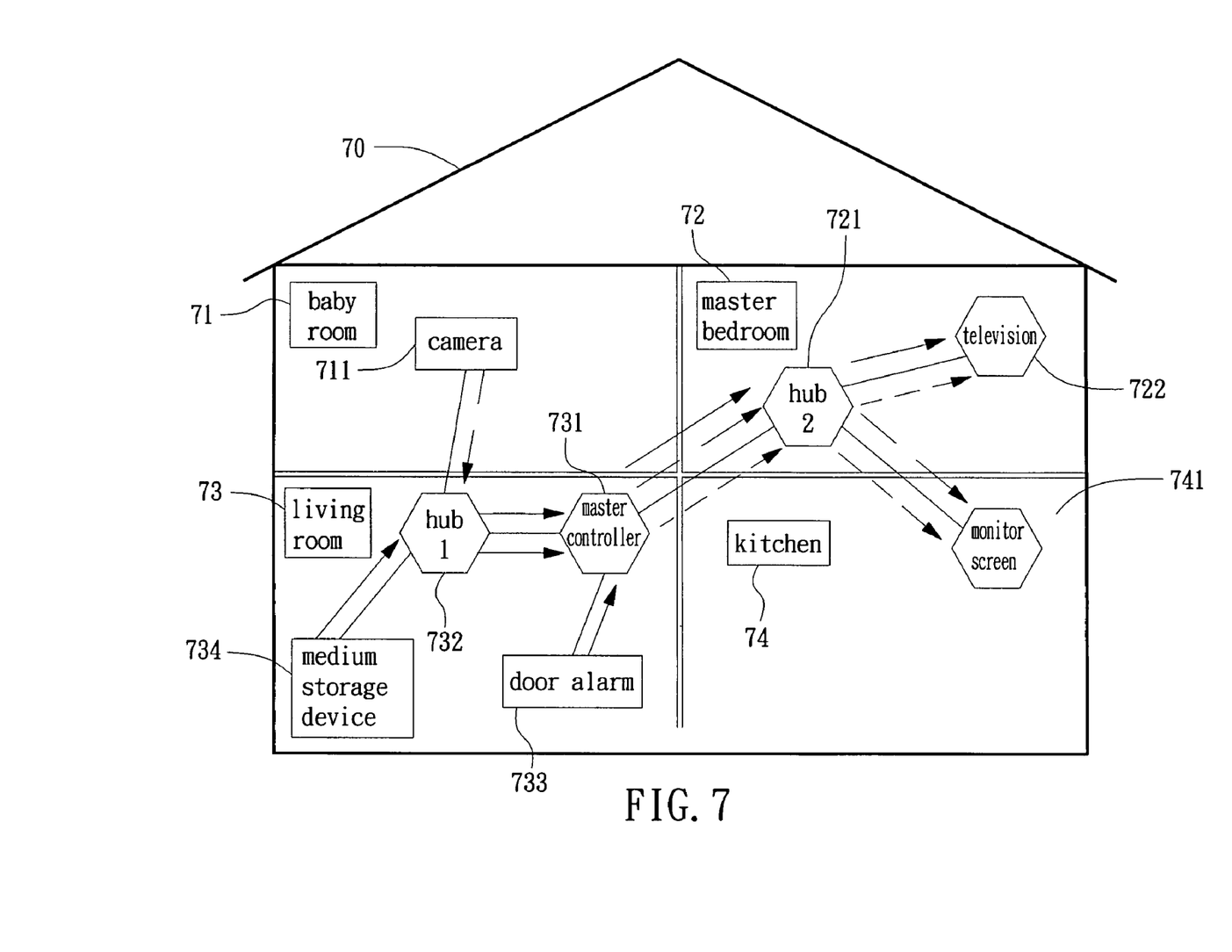
FIG. 7 is a schematic view of a multi-protocol network architecture of a household network.

Referring to FIG. 7 for a schematic view of a multi-protocol network architecture of a household network, data of three protocols including Ethernet, CAN and RS-485 are transmitted. After the network is constructed, the message transmission rate of each protocol, the data volume of the transmitting messages and the priority of the packets are determined by a master control station, and the application in accordance with this embodiment is described as follows.

Assumed that a master is watching a movie transmitted from a medium storage device 734 in a master bedroom 72 from a television 722, the whole procedure of transmitting data goes through a path from the medium storage device 734→hub 1 (732)→master controller 731→hub 2 (721) →television 722, and the network protocol of the transmitted data is an Ethernet network protocol. Assumed that a mistress who is cleaning up the dishes and leftovers of a dinner in the kitchen 74 is monitoring a baby who is sleeping in a baby room 71 from a monitor screen 741 through a camera 711, the transmission procedure goes through a path from a camera 711→hub 1 (732)→master controller 731→hub 2 (721) →monitor screen 741, and the network protocol of the transmitted data is a CAN network protocol. Now, if a door alarm 733 is triggered, a warning signal will be transmitted to an alarm device near the master and the mistress, and a message will be displayed on the television 722 and the monitor screen 741, and the procedure of transmitting the message goes through the path from the door alarm 733→master controller 731→hub 2(721)→television 722 and monitor screen 741, and the network protocol of the transmitted data is a RS-485 network protocol. From the aforementioned situation, the Ethernet provided for transmitting a large quantity of audio and video signals, the CAN network provided for transmitting monitor signals, and the RS-485 network provided for transmitting ON/OFF signals are used in appropriate occasions according to their attributes and specifications.

From the description above, the transmission path of each network protocol is re-arranged as follows. In an Ethernet channel, data are transmitted from the medium storage device to the hub 1, the master controller, the hub 2, and the television sequentially. In a CAN channel, data are transmitted from the camera to the hub 1, the master controller, the hub 2, and the monitor screen sequentially. In a RS-485 channel, data are transmitted from the door alarm to the master controller, the hub 2, and the television and the monitor screen sequentially.

Figure 8:
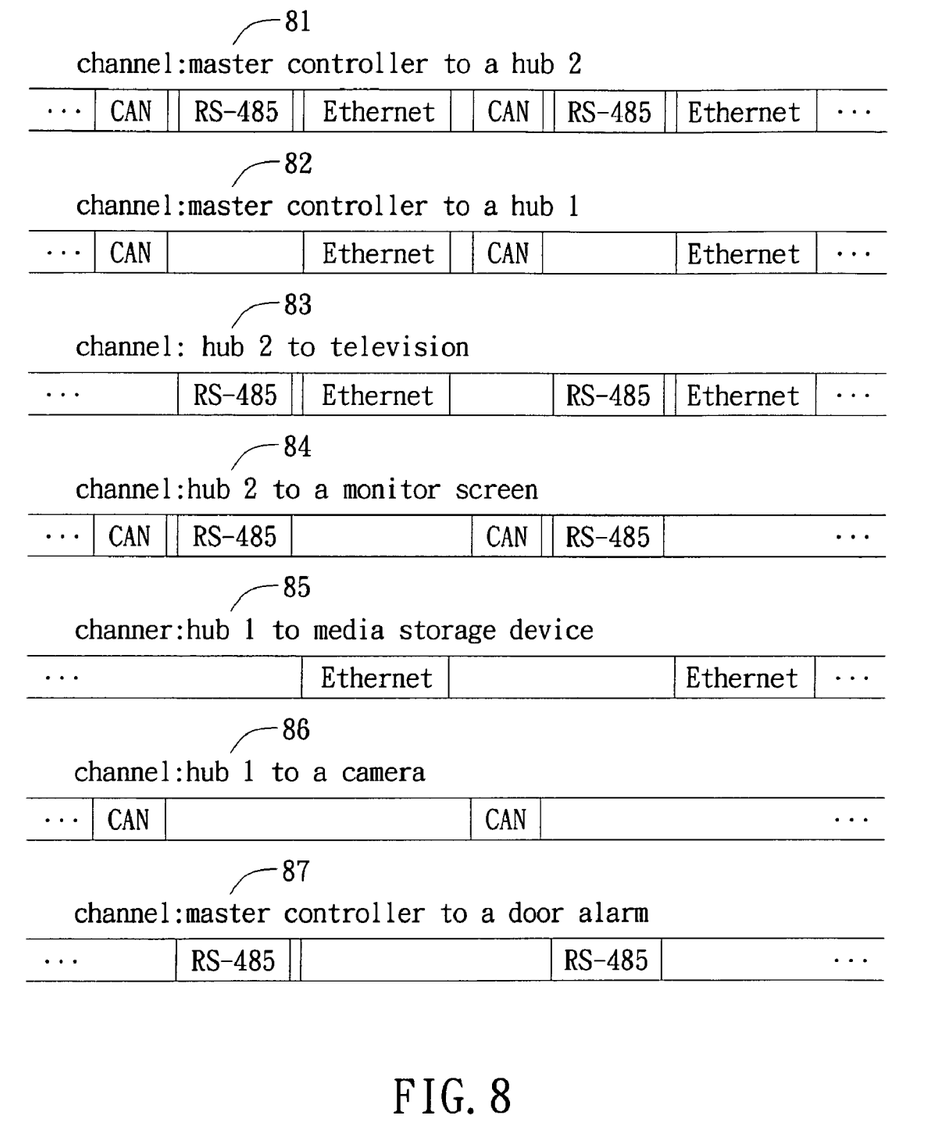
FIG. 8 is a schematic view of transmitting a multi-protocol packet at each channel in accordance with a preferred embodiment of the present invention.

Referring to FIG. 8 for a schematic view of transmitting a multi-protocol packet at each channel in accordance with a preferred embodiment of the present invention, this embodiment includes seven channels for transmitting data of different protocols, wherein a channel 81 transmits data from a master controller to a hub 2, a channel 82 transmits data from the master controller to a hub 1, a channel 83 transmits data from hub 2 to television, a channel 84 transmits data from the hub 2 to a monitor screen, channel 85 from hub 1 to media storage device, channel 86 from hub 1 to a camera, and a channel 87 transmits data from the master controller to a door alarm.

In summation of the detailed description of the foregoing preferred embodiments, the present invention discloses a method and an apparatus for transmitting data via a multi-protocol single-medium network, and the method and apparatus are used for transmitting packets of different network protocols through a single channel. The method comprises the steps of: initializing a network; transmitting a plurality of messages via the network; using a multi-protocol network protocol stack on a network physical layer to assign the multi-protocol network protocol based on a time sharing multitasking principle; setting the size of the plurality of messages and the communication protocol of the plurality of messages and assigning the plurality of set messages to appropriate time slots; checking whether or not all messages are assigned to the time slots; if yes, transmitting the plurality of messages; and selectively receiving the plurality of appropriate messages through a network device and transmitting the messages to another network device through a single-medium network; wherein the network device can receive messages of different network protocols, and convert the messages to another network device after the network protocol of the messages is converted. The network device comprises: a high-speed sampling circuit, for building a multi-protocol network physical layer; a microcontroller, for controlling a protocol determination unit and a multi-protocol network media access control layer in a multi-protocol transceiver by software, and determining a protocol, a destination, a time slot, a priority and a data length of the packet. Therefore, the network protocols of different attributes are integrated, and a single cable is used for transmitting the multi-protocol messages. As a result, the present invention can effectively lower the cost of constructing a multi-protocol network while maintaining the transmission functions of the original protocol.

While the invention has been described by means of specific embodiments, numerous modifications and variations could be made thereto by those skilled in the art without departing from the scope and spirit of the invention set forth in the claims.

What is claimed is:

1. A method of transmitting data using time division multiplexing via a multi-protocol single-medium network, applied to a single channel for transmitting a plurality of packets of different network protocols, the method comprising:

receiving a first data packet and a second data packet by a physical layer wherein the physical layer is coupled to the multi-protocol single-medium network;

identifying the first data packet is in a first protocol by utilizing a protocol determination unit to recognize a first protocol marker in the first data packet corresponding to the first protocol of the first data packet, wherein the protocol determination unit is logically coupled between the physical layer and media access control (MAC) layers of the network protocols;

forwarding the first data packet to a first media access control (MAC) layer process corresponding to a first protocol stack after removing the first protocol marker;

identifying the second data packet is in a second protocol by utilizing the protocol determination unit to recognize a second protocol marker in the second data packet corresponding to the second protocol of the second data packet, wherein the second protocol marker is different from the first protocol marker indicating the first protocol and second protocol are distinct; and forwarding the second data packet to a second media access control (MAC) layer process corresponding to a second protocol stack after removing the second protocol marker.

2. The method as recited in claim 1, wherein the first protocol is an Internet Protocol (IP) network protocol and the second protocol is a non-IP network protocol.

3. The method as recited in claim 1, wherein the first protocol is a cable network protocol.

4. The method as recited in claim 1, further comprising a step of using a first protocol marker for identifying the first protocol and a second protocol marker for identifying the second protocol.

5. The method as recited in claim 4, further comprising:
   determining the first data packet's length and the second data packet's length.

6. An apparatus of transmitting data applied for transmitting or receiving different network protocol packets in a single-medium network, comprising:

a physical layer, coupled to a single medium network and for receiving and transmitting a first data packet having a first protocol and a second data packet having a second protocol;

a protocol determination unit, logically coupled to the physical layer and for recognizing a first protocol marker identifying the first protocol and a second protocol marker identifying the second protocol;

multiple media access control (MAC) layers, corresponding to different network protocols, logically coupled to the protocol determination unit, including a first media access control layer and a second media access control layer, wherein the protocol determination unit is logically coupled between the physical layer and the multiple media access control (MAC) layers; and a microcontroller, coupled to the first media access control (MAC) layer and the second media access control (MAC) layer;

wherein when the protocol determination unit receives the first data packet from the physical layer and recognizes a first protocol marker which identifies the first data packet is in the first protocol, the protocol determination unit removes the first protocol marker and forwards the first data packet to the first media access control (MAC) layer; and when the protocol determination unit receives the second data packet from the physical layer and recognizes the second protocol marker which identifies the second data packet is in the second protocol, the protocol determination unit removes the second protocol marker and forwards the second data packet to the second media access control (MAC) layer.

7. The apparatus as recited in claim 6, is made of a FPGA Field Programmable Gate Array (FPGA) or an Application Specific Integrated Circuit (ASIC).

8. The apparatus as recited in claim 6, wherein the first protocol is an Internet Protocol (IP) network protocol and the second protocol is a non-IP network protocol.

9. The apparatus as recited in claim 6, wherein the first protocol is for a cable network protocol.

10. The apparatus as recited in claim 6, wherein the microcontroller, a protocol marker, synchronizes packet transmitting and packet receiving, controls the protocol determination unit to identify the first protocol and the second protocol, and determines the first packet's length and the second packet's length.

* * * * *